United States Patent
Ibrahim et al.

(10) Patent No.: US 7,574,039 B2
(45) Date of Patent: Aug. 11, 2009

(54) VIDEO BASED FIRE DETECTION SYSTEM

(75) Inventors: Mohamed M. Ibrahim, Kayalpatnam (IN); Muralidhar N. Chowdary, Tirupati (IN)

(73) Assignee: Honeywell International Inc., Morristown, NJ (US)

( * ) Notice: Subject to any disclaimer, the term of this patent is extended or adjusted under 35 U.S.C. 154(b) by 850 days.

(21) Appl. No.: 11/167,869

(22) Filed: Jun. 27, 2005

(65) Prior Publication Data

US 2006/0215904 A1 Sep. 28, 2006

(30) Foreign Application Priority Data

Mar. 24, 2005 (IN) .................................. 649/05

(51) Int. Cl.
*G06K 9/00* (2006.01)
(52) U.S. Cl. .................. 382/167; 382/162; 382/165; 382/156; 382/159; 382/218; 431/12
(58) Field of Classification Search .................. 382/103, 382/156, 168, 170, 159, 162, 167, 165, 305, 382/218; 431/12
See application file for complete search history.

(56) References Cited

U.S. PATENT DOCUMENTS 7,149,325 B2 * 12/2006 Pavlidis et al. .............. 382/103
2003/0044042 A1 * 3/2003 King et al. .................. 382/100
2003/0141980 A1 * 7/2003 Moore et al. ................ 340/578
2004/0163827 A1 8/2004 Privalov et al.
2004/0175040 A1 9/2004 Rizzotti et al.

OTHER PUBLICATIONS

Foo, S. Y., "A rule based machine vision system for fire detection in aircraft dry bays and engine compartments", *Knowledge based systems*, vol. 9, (1995),531-541.
Grosshandler, W. L., "Proceedings of the 1995 Workshop on Fire Detector Research", *National Institute of Standards and Technology, NISTIR 5700*, Gaithersburg, USA, (Jun. 1995),43 pgs.
Phillips, III, Walter, et al., "Flame Recognition in Video", *Pattern Recognition Letters*, vol. 23 (1-3), (Jan. 2002),319-327.
Jacobson, E., "Finding Novel Fire Detection Technologies fo rthe Offshore Industry", *Fire*, 96(1137), (Mar. 2000), 26.
Lloyd, D., "Video Smoke Detection (VSD-8)", *Fire Safety Engineering*, 7(1), (Jan. 2000), 26-28.
Morgan, A., "New fire detection concepts with fibre optics technology", *Fire Safety Engineering*, (Apr. 2000), 35-37.
Pati, V. B., et al., "Simulation of Intelligent Fire Detection and Alarm Systems for a Warship", *Defence Science Journal*, vol. 39, No. 1, (1989), 79-94.

\* cited by examiner

*Primary Examiner*—Matthew C Bella
*Assistant Examiner*—Ali Bayat
(74) *Attorney, Agent, or Firm*—Schwegman, Lundberg & Woessner, P.A.

(57) ABSTRACT

A fire detection system has a video sensor, a processor, and a database. The database has a statistical model representing the characteristics of a fire. The video sensor captures images, and sends the images to the processor. The processor computes statistics on the characteristics of the captured image, and compares it to the statistical model to determine if a fire is present in the captured image.

19 Claims, 2 Drawing Sheets

VIDEO BASED FIRE DETECTION SYSTEM

CROSS REFERENCE TO RELATED APPLICATIONS

This application claims priority to India Patent Application No. 649/DEL/2005, filed Mar. 24, 2005, which is incorporated herein by reference.

TECHNICAL FIELD

The invention relates to systems and methods for fire detection, and in particular, video based systems and methods for fire detection.

BACKGROUND

Many traditional fire detection systems use some combination of infrared (IR) and ultraviolet (UV) sensors. These sensors detect the presence of the IR and/or UV radiation emitted by a nearby fire, and sound an alarm of one type or another. In an effort to avoid operating in the UV spectrum, dual and triple IR fire detection systems were developed. These dual and triple IR systems are more sensitive than conventional IR and UV systems, yet produce fewer false alarms than the conventional IR or UV systems. In addition to IR and UV technologies, other systems have been developed to handle special environments. For example, distributed fiber optic temperature sensors were developed for applications with difficult ambient conditions such as tunnels and railways. Also, systems have been developed based on the detection of smoke, heat, and/or carbon monoxide.

Advances in sensor, microelectronic, and information technologies have led to new fire detection technologies in recent years—for example, fire detection systems using vision based technology. In vision based systems, a fire is modeled as a function of its vision characteristics such as color, contrast, texture, and temporal differences to distinguish a fire from non-fire sources. Such vision based systems employ a parametric model to consider these characteristics in its fire detection algorithm. Specifically, many video based fire detectors use a two step procedure to identify a fire. First, a color, contrast and texture analysis is performed, followed by a temporal difference based analysis. In these systems, color, since it is the strongest feature among all of the fire characteristics, is frequently used to build the model. Using training video frames (i.e. video frames of an actual fire), a three-dimensional RGB (red, green, blue) histogram is generated to represent the fire color. The generation of such a histogram is computationally intensive. Then, after a fire detection system is installed, a RGB triplet generated from the input of the video sensor is identified as belonging to a fire if it satisfies a preset threshold on the three-dimensional histogram.

DETAILED DESCRIPTION

Figure 1:
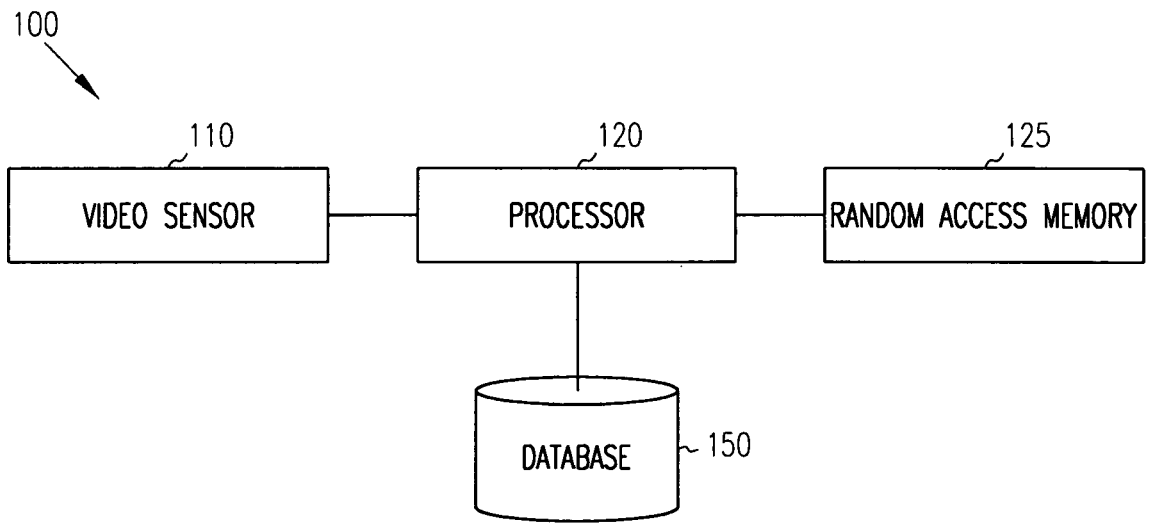
FIG. 1 illustrates equipment and hardware used in an embodiment of the invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

An embodiment of the invention is a video based fire detection system that uses a block-based statistical Gaussian measurement scheme with a training phase and a detection phase. FIG. 1 illustrates the equipment and hardware that may be used in an embodiment of the system. The system 100 includes a video sensor 110. The video sensor 110 is coupled to a processor 120, which is turn is coupled to random access memory 125 and a database 150. The video sensor 110 captures an image, and transmits it to the processor. As will be explained in detail infra, the processor calculates statistical values on the captured image, and compares these statistics with other statistics of training fires that are stored in the database 150. Based on the difference of these statistical values, and in one embodiment a subsequent statistical analysis, the system determines if a fire exists in the field of vision of the video sensor.

Figure 2:
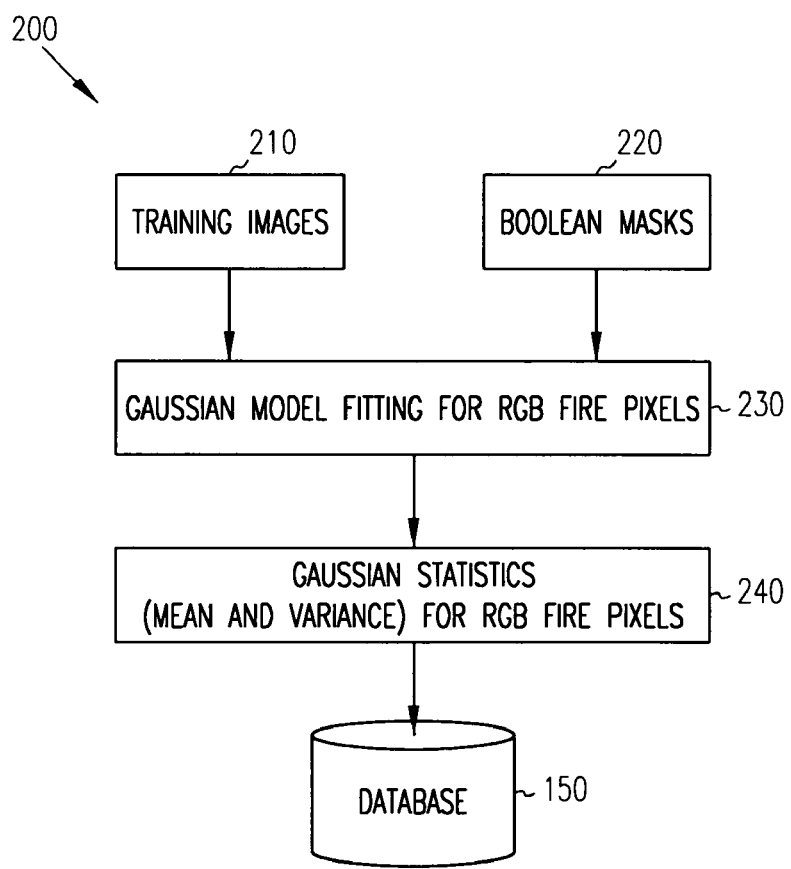
FIG. 2 is a flowchart illustrating a training phase of an embodiment of the invention.

In FIG. 2, the training phase 200 has a training images segment 210, and a Boolean mask segment 220. The training images 210 and Boolean masks 220 are processed together in a Gaussian model 230 for a red/green/blue (RGB) triplet of pixels. The Gaussian statistics 240, which in this embodiment are the mean and the variance for the RGB pixels, are stored on a storage medium such as a hard disk 150.

The training phase is conducted before system installation, and includes capturing a fire on video, and calculating statistical information on the fire. In the training phase, which in this embodiment is only conducted once and stored in non-volatile memory medium 150, works on pairs of training images. The training image pair consist of a color image and a Boolean mask. The Boolean mask specifies the locations at which the target object (fire) occurs. Then, for every pixel in each image that represents a color (RGB) that is being searched for, there should be a "1" in a corresponding location in the Boolean mask. In contrast, there should be a "0" in the Boolean mask corresponding to every background location. The Boolean mask then allows the system to determine the pixels for which statistical calculations should be performed. In an embodiment, multiple training images, such as ten or more, from different scenarios are considered in order to make the algorithm of this embodiment more robust.

The pixels that are associated with a Boolean mask value of "1" are identified as "fire" pixels, and the three color components of RGB are then modeled as a Gaussian distribution—that is, the Gaussian statistics of mean and variance for these three color components are computed. These statistical measurements for the RGB components are stored in memory 150 for use in the detection phase of this embodiment.

For example, in the training video, there may be a thousand or more pixels that are identified as fire pixels. For each of these pixels, the values representing the intensity of the Red component of these pixels are summed and averaged, the values representing the intensities of the Green components of these pixels are summed and averaged, and the values representing the intensities of the Blue components of these pixels are summed and averaged. After averaging, a variance from the mean of each pixel intensity is calculated. It is then these six statistical values, the RGB means and the RGB variances, that are stored in memory 150 for use in the detection phase.

Figure 3:
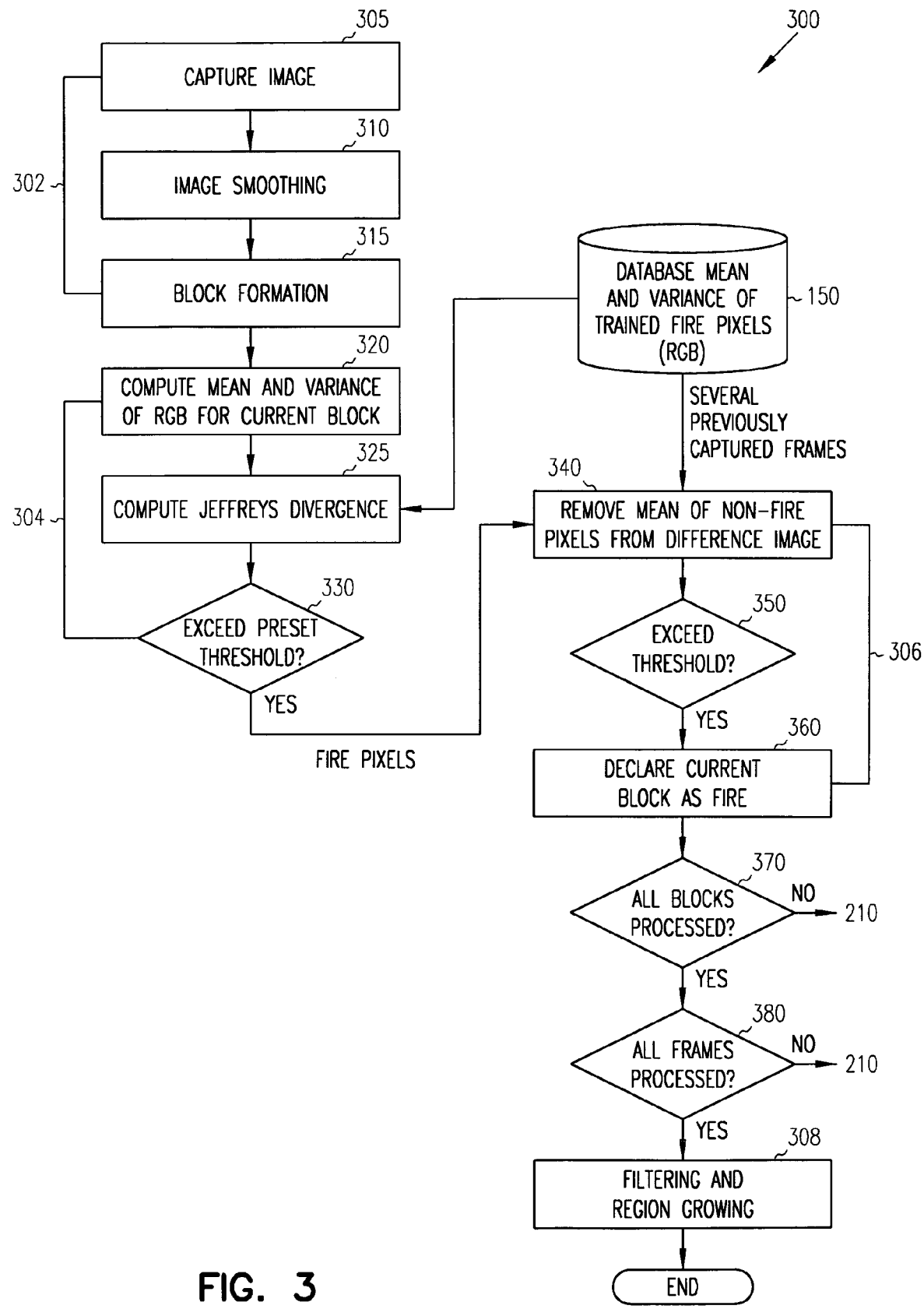
FIG. 3 is a flowchart illustrating a detection phase of an embodiment of the invention.

FIG. 3 illustrates the detection phase 300 and includes preprocessing 302, color based segmentation 304, temporal difference based segmentation 306, and post processing 308.

The preprocessing stage 302 of the detection phase 300 involves first capturing an image with the video sensor 110 at 305. Image smoothing techniques 310 are applied to the captured image to filter out any noise in the image. After image smoothing, the image is divided up into blocks at 315. In the embodiment of FIG. 3, a block is a matrix of 3×3 pixels, and each block has no pixels that overlap with another block.

In the color based segmentation stage 304, the detection of a fire is based on the computation of a distribution divergence between trained data distribution (i.e. in FIG. 2, the data that was calculated at 240 and stored in database 150) and the new incoming distribution (based on the new data in a captured frame). Specifically, in an embodiment, this involves computing a mean and variance at 320 for the RGB colors for each block in the captured frame. That is, for each of the nine pixels in a 3×3 block, the values representing the Red intensities are summed, the values representing the Green intensities are summed, and the values representing the Blue intensities are summed. A mean and variance for each color in each block is then calculated. Then, for each block in the captured frame, a distribution divergence, also referred to as a Jeffreys divergence, is calculated at 325 between the existing or trained distribution stored on hard disk 150 and the new distribution for the three color components RGB of a block. The calculation is as follows:

$$J(f, g) = \frac{3}{2}\left(\frac{\sigma_f}{\sigma_g} - \frac{\sigma_g}{\sigma_f}\right)^2 + \frac{1}{2}\left(\frac{1}{\sigma_f^2} + \frac{1}{\sigma_g^2}\right)^2 (\mu_g - \mu_f)(\mu_g - \mu_f)$$

where $\mu_f$=Distribution mean of a block
$\mu_g$=Distribution mean from training data
$\sigma_f$=Distribution variance of a block
$\sigma_g$=Distribution variance from training data Then, for each color in each block, a preset threshold is applied on the divergence measure at 330 to determine whether a particular color (RGB) of that block is in the fire region or not. In one embodiment, if two or three of the colors are in the fire region, that block is identified as a "fire" block.

After identifying the blocks in a captured image that are to be identified as fire blocks, the temporal difference based detection phase 306 differentiates between a fire and fire look alike events such as the sun, red leaves, or particular artificial lighting. Specifically, in a temporal analysis of consecutive frames, a fire moves significantly, thereby creating a rather high level of intensity changes in fire pixel frames. To measure these intensity changes, in an embodiment, an average temporal difference of all the fire blocks between several consecutive captured frames is calculated. Prior to this, the mean from non-fire pixels are removed at 340, and this nullifies the intensity changes due to non-fire events. Then, this temporal difference, in conjunction with the color based fire detection, is applied to a predetermined threshold at 350 to determine if a fire exists or not (360).

After determining whether the current block is a fire block or a non-fire block, the system checks to see if there are remaining blocks that need to be processed at 370, and whether there are frames remaining that need to be processed at 380.

In the post processing phase 308, the detection of a fire is improved by a sequence of operations such as filtering and region growing at 390. The filtering removes sparse spurious pixels that are incorrectly detected as fire pixels. The logic behind this filtering being that if only a sparse appearance of fire pixels appear, with no other fire region detected, then there is no fire. Using region growing techniques, the density of the fire region is enhanced.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A method comprising:
    capturing a set of training images of a fire;
    using a processor to model said fire for a color channel using Gaussian statistics;
    storing said statistics in a database;
    capturing a second image;
    isolating a block within said second image;
    using the processor to compute Gaussian statistics for a color channel in said block; and
    using the processor to compare said Gaussian statistics of said fire with said Gaussian statistics of said block.

2. The method of claim 1, further comprising determining whether a fire is present in said second image based upon said comparing of said Gaussian statistics of said fire with said Gaussian statistics of said block.

3. The method of claim 1, wherein said Gaussian statistics of said fire and said Gaussian statistics of said block comprise a mean and a variance.

4. The method of claim 3, wherein said comparing of said Gaussian statistics of said fire with said Gaussian statistics of said block comprises computing a Jeffreys Divergence.

5. The method of claim 4, wherein said Jeffreys Divergence is computed by the following equation:

$$J(f,g) = \frac{3}{2}\left(\frac{\sigma_f}{\sigma_g} - \frac{\sigma_g}{\sigma_f}\right)^2 + \frac{1}{2}\left(\frac{1}{\sigma_f^2} + \frac{1}{\sigma_g^2}\right)^2 (\mu_g - \mu_f)(\mu_g - \mu_f)$$

wherein $\mu_f$ represents said mean for said color channel in said block;

$\mu_g$ represents said mean for said color channel for said first image;

$\sigma_f$ represents said variance for said color channel in said block; and $\sigma_g$ represents said variance for said color channel for said first image.

6. The method of claim 1, wherein said block comprises a matrix of pixels.

7. The method of claim 6, wherein said color channel associated with each said pixel comprises a Red channel, a Green channel, and a Blue channel.

8. The method of claim 6, further comprising providing a Boolean mask indicating pixels of said set of training images that comprise a fire.

9. The method of claim 1, further comprising:
capturing a plurality of said second images;
calculating changes in color intensity levels in a block among said plurality of said second images;
comparing said changes in color intensity levels with a preset threshold; and
determining whether a fire is present in said second images based on said comparison.

10. An article comprising:
a processor;
a video sensor coupled to said processor; and
a memory coupled to said processor, said memory comprising a mean and a variance of color characteristics of a fire, and further comprising logic for comparing said mean and said variance with an image captured by said video sensor;
wherein said logic for comparing said mean and said variance of color characteristics of a fire and said image captured by said video sensor comprises a Jeffreys divergence.

11. The article of claim 10, further comprising a representation of a block of pixels in said memory, each pixel in said block comprising a value associated with a color of said pixel, said color of a pixel represented by a value representing a red segment of said color, a value representing a green segment of said color, and a value representing a blue segment of said color.

12. The article of claim 10, wherein said video sensor captures a plurality of images, wherein said logic calculates a change in color intensity levels of said images, and further wherein said logic determines whether a fire exists in said images by comparing said change in color intensity levels with a preset threshold.

13. A computer readable medium comprising instructions thereon for executing a process comprising:
providing Gaussian statistics of a fire for a color channel in a database;
capturing an image;
isolating a block within said image;
computing Gaussian statistics for a color channel in said block; and
comparing said Gaussian statistics of a fire with said Gaussian statistics of said block.

14. The computer readable medium of claim 13, wherein said Gaussian statistics of a fire and said Gaussian statistics of said block comprise a mean and a variance.

15. The computer readable medium of claim 13, wherein said block comprises a matrix of pixels.

16. The computer readable medium of claim 15, wherein said color channel associated with each said pixel comprises a red channel, a green channel, and a blue channel.

17. The computer readable medium of claim 13, wherein said comparing said Gaussian statistics of a fire with said Gaussian statistics of said block comprises computing a Jeffreys divergence.

18. The computer readable medium of claim 17, wherein said Jeffreys Divergence is computed by the following equation:

$$J(f,g) = \frac{3}{2}\left(\frac{\sigma_f}{\sigma_g} - \frac{\sigma_g}{\sigma_f}\right)^2 + \frac{1}{2}\left(\frac{1}{\sigma_f^2} + \frac{1}{\sigma_g^2}\right)^2 (\mu_g - \mu_f)(\mu_g - \mu_f)$$

wherein $\mu_f$ represents said mean for said color channel in said block;

$\mu_g$ represents said mean for said color channel for said first image;

$\sigma_f$ represents said variance for said color channel in said block; and $\sigma_g$ represents said variance for said color channel for said first image.

19. The computer readable medium of claim 13, further comprising:
capturing a plurality of images;
calculating a change in color intensity level of said images; and
determining whether a fire exists in said images by comparing said change in color intensity level with a preset threshold.

* * * * *

UNITED STATES PATENT AND TRADEMARK OFFICE
CERTIFICATE OF CORRECTION

PATENT NO. : 7,574,039 B2
APPLICATION NO. : 11/167869
DATED : August 11, 2009
INVENTOR(S) : Ibrahim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Seventh Day of September, 2010

David J. Kappos
*Director of the United States Patent and Trademark Office*